United States Patent
Cai et al.

(10) Patent No.: US 9,699,323 B2
(45) Date of Patent: Jul. 4, 2017

(54) SEPARATE CHARGING FOR SUPPLEMENTAL CONTENT IN A DATA FLOW

(71) Applicants: Yigang Cai, Naperville, IL (US); Ranjan Sharma, New Albany, OH (US)

(72) Inventors: Yigang Cai, Naperville, IL (US); Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 439 days.

(21) Appl. No.: 13/930,366

(22) Filed: Jun. 28, 2013

(65) Prior Publication Data
US 2015/0003298 A1    Jan. 1, 2015

(51) Int. Cl.
*H04M 15/00*    (2006.01)
*H04L 12/14*    (2006.01)

(52) U.S. Cl.
CPC ........ *H04M 15/63* (2013.01); *H04L 12/1425* (2013.01); *H04L 12/1471* (2013.01); *H04M 15/41* (2013.01); *H04M 15/43* (2013.01); *H04M 15/60* (2013.01); *H04M 15/64* (2013.01); *H04M 15/67* (2013.01)

(58) Field of Classification Search
CPC ...... H04M 15/58; H04M 15/41; H04M 15/44; H04M 15/60; H04M 15/80; H04M 15/61; H04M 15/62; H04M 15/66; H04M 15/43; H04M 15/63; H04M 15/8022; H04M 15/8292; H04M 2215/0164; H04M 15/68; H04M 3/4878; H04L 12/14; H04L 12/1403; H04L 12/1407; H04L 12/141; H04L 67/02; H04L 12/1446; H04L 12/1475; H04L 43/0876; H04W 4/24; H04W 4/26
USPC ......................................... 455/405, 407, 408
See application file for complete search history.

(56) References Cited

U.S. PATENT DOCUMENTS

| | | | |
|---|---|---|---|
| 7,242,668 B2 * | 7/2007 | Kan et al. | 370/234 |
| 8,341,044 B1 * | 12/2012 | Patro et al. | 705/34 |
| 9,071,519 B1 * | 6/2015 | Patro | |
| 2003/0093341 A1 | 5/2003 | Millard et al. | |
| 2004/0266394 A1 * | 12/2004 | Mizell et al. | 455/408 |
| 2008/0261559 A1 * | 10/2008 | Cai et al. | 455/406 |
| 2011/0051615 A1 * | 3/2011 | Yu | 370/252 |

(Continued)

FOREIGN PATENT DOCUMENTS

WO    02071788 A1    9/2002

*Primary Examiner* — Magdi Elhag
(74) *Attorney, Agent, or Firm* — Duft Bornsen & Fettig, LLP

(57) ABSTRACT

Systems and methods that provide charging for supplemental content in a data flow separately from other content in the data flow. One embodiment comprises a network element of a Packet-Switched (PS) network that serves mobile User Equipment (UE). The network element receives a data flow of packets for a download of content requested by the UE, and identifies supplemental content in the data flow not requested by the UE, such as advertising content. The network element generates a charging request, inserts charging information for the supplemental content in the charging request, and transmits the charging request to a charging system so that the supplemental content can be charged separately from other content of the data flow.

16 Claims, 6 Drawing Sheets

(56) References Cited

U.S. PATENT DOCUMENTS

| | | |
|---|---|---|
| 2011/0145115 A1 | 6/2011 | Kim et al. |
| 2011/0238547 A1* | 9/2011 | Belling et al. .................. 705/34 |
| 2011/0275345 A1* | 11/2011 | Cai et al. ...................... 455/406 |
| 2012/0236871 A1* | 9/2012 | Wallace et al. ............... 370/401 |
| 2014/0349606 A1* | 11/2014 | Cai et al. ...................... 455/406 |
| 2015/0381522 A1* | 12/2015 | Cai ....................... H04L 47/803 |
| | | 370/389 |

* cited by examiner

SEPARATE CHARGING FOR SUPPLEMENTAL CONTENT IN A DATA FLOW

FIELD OF THE INVENTION

The invention is related to the field of communication systems and, in particular, to charging for sessions of a communication system.

BACKGROUND

Service providers typically offer numerous voice and data services to end users of mobile devices. Some examples of voice services are voice calls, call forwarding, call waiting, etc. Some examples of data services are Internet access, streaming audio, streaming video, online gaming, Internet Protocol television (IP-TV), etc.

The first types of wireless or mobile networks that were introduced by services providers were First Generation (1G) and Second Generation (2G) networks. 1G networks provided voice services via analog signals, and then evolved into 2G networks that provided voice services via digital signals. Mobile communications then evolved into 3G (including 2.5G) networks that provided both voice services and data services. For example, 3G networks are able to provide wireless voice telephony, as well as data services such as Internet access, video calls, mobile TV, etc. Some of the 3G networks implemented by service providers were Universal Mobile Telecommunications System (UMTS) networks, Enhanced Voice Data Optimized (EV-DO) networks, General Packet Radio Service (GPRS) networks, etc. Service providers are now beginning to migrate their networks toward Fourth Generation (4G) technologies over Packet-Switched (PS) networks. 4G networks are essentially enhancements to 3G networks in terms of data speeds. For example, a 3G network can provide data speeds of about 3.5 Mbit/sec. According to the International Telecommunication Union (ITU), a 4G network can provide data speeds of 100 Mbit/sec. One example of a 4G network is a Long Term Evolution (LTE) network.

When a mobile device initiates a session over a PS network (e.g., an IP Connectivity Access Network (IP-CAN) session), the session request from the mobile device includes a description of the requested service (e.g., online gaming, IP-TV, etc). The PS network authenticates the mobile device and determines which services the mobile device is authorized to receive. If the requested service is authorized, then the PS network reserves a bearer path (e.g., an IP CAN bearer) of a defined capacity, delay, and bit error rate over a selected Packet Data Network (PDN). A flow of packets may then begin for the service, which is referred to as a data flow or a service data flow over the PDN.

SUMMARY

There are entities that are able to insert additional or supplemental content, such as advertising content, into a data flow of a session. In certain instances the supplemental content may not have been requested by an end user. For example, if an end user requests to download a video from a content provider, then the content provider (or an intermediate entity) may insert an advertisement into the data flow for the video so that the end user sees the advertisement when watching the video. This can be problematic as the end user may be charged based on the amount of bandwidth consumed during a time period. Because this supplemental content is inserted in the data flow for a session, the end user could ultimately be charged for the bandwidth consumed by the transfer of the supplemental content to the user's mobile device.

Embodiments described herein allow supplemental content to be charged separately from other content of a data flow that was specifically requested by an end user. When a network element serves a session of an end user, the network element identifies supplemental content in a data flow of the session, such as advertising content in a data flow. The network element then inserts charging information for the supplemental content in a charging request that is sent to a charging system. The charging system can then charge for the supplemental content separately from other content of the data flow that was requested by the end user. Thus, the end user may not be charged for bandwidth consumed for the supplemental content. For example, the end user may not be charged for advertising content when the end user had no desire to download the advertising content in the first place.

One embodiment comprises a network element for a Packet-Switched (PS) network that serves mobile User Equipment (UE). The network element is configured to receive a data flow of packets for a download of content requested by the UE, and to identify supplemental content (e.g., advertising content) in the data flow that was not requested by the UE. The network element is configured to generate a charging request, to insert charging information for the supplemental content in the charging request, and to transmit the charging request to a charging system. The charging system can then charge for the supplemental content separately from the content requested by the UE.

In another embodiment, the network element is configured to measure an amount of the supplemental content in the data flow, and to insert an indicator of the amount of the supplemental content in the charging request.

In another embodiment, the network element is configured to count a number of packets carrying the supplemental content in the data flow, and to insert an indicator of the number of packets carrying the supplemental content in the charging request.

In another embodiment, the network element is configured to identify a party responsible for the supplemental content, and to insert an indicator of the party in the charging request.

In another embodiment, the network element is configured to process an identifier in a header field of a respective packet in the data flow which indicates whether the respective packet carries the supplemental content.

In another embodiment, the charging request comprises a Diameter charging request, and an Attribute Value Pair (AVP) is defined for the charging information for the advertising content in the Diameter charging request.

In another embodiment, the network element is configured to insert charging information for the content requested by the UE in the charging request separately from the charging information for the supplemental content.

In another embodiment, the network element is configured to generate a second charging request, and to insert charging information for the content requested by the UE in the second charging request.

Another embodiment comprises a method operable in a network element for a PS network that serves a mobile UE. The method includes receiving a data flow of packets for a download of content requested by the UE, and identifying supplemental content in the data flow, where the supplemental content was not requested by the UE. The method further includes generating a charging request, inserting charging information for the supplemental content in the charging request, and transmitting the charging request from the network element to a charging system.

In another embodiment, inserting charging information for the supplemental content in the charging request comprises measuring an amount of the supplemental content in the data flow, and inserting an indicator of the amount of the supplemental content in the charging request.

In another embodiment, inserting charging information for the supplemental content in the charging request comprises counting a number of packets carrying the supplemental content in the data flow, and inserting an indicator of the number of packets carrying the supplemental content in the charging request.

In another embodiment, inserting charging information for the supplemental content in the charging request comprises identifying a party responsible for the supplemental content, and inserting an indicator of the party in the charging request.

In another embodiment, identifying supplemental content in the data flow comprises processing an identifier in a header field of a respective packet in the data flow which indicates that the respective packet carries the supplemental content.

In another embodiment, the method further comprises inserting charging information for the content requested by the UE in the charging request separately from the charging information for the supplemental content.

In another embodiment, the method further comprises generating a second charging request, and inserting charging information for the content requested by the UE in the second charging request.

Another embodiment comprises a charging system configured to receive a charging request from a network element for a data flow of a mobile UE over a PS network. The charging system is configured to parse the charging request to identify charging information for supplemental content that was inserted in the data flow, where the supplemental content was not requested by the UE. The charging system is configured to initiate charging for the supplemental content separately from other content of the data flow that was requested by the UE based on the charging information for the supplemental content.

In another embodiment, the charging system is configured to parse the charging request to identify charging information for the other content of the data flow that was requested by the UE.

In another embodiment, the charging system is configured to receive a second charging request from the network element, and to parse the second charging request to identify charging information for the other content of the data flow that was requested by the UE.

Other exemplary embodiments may be described below.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
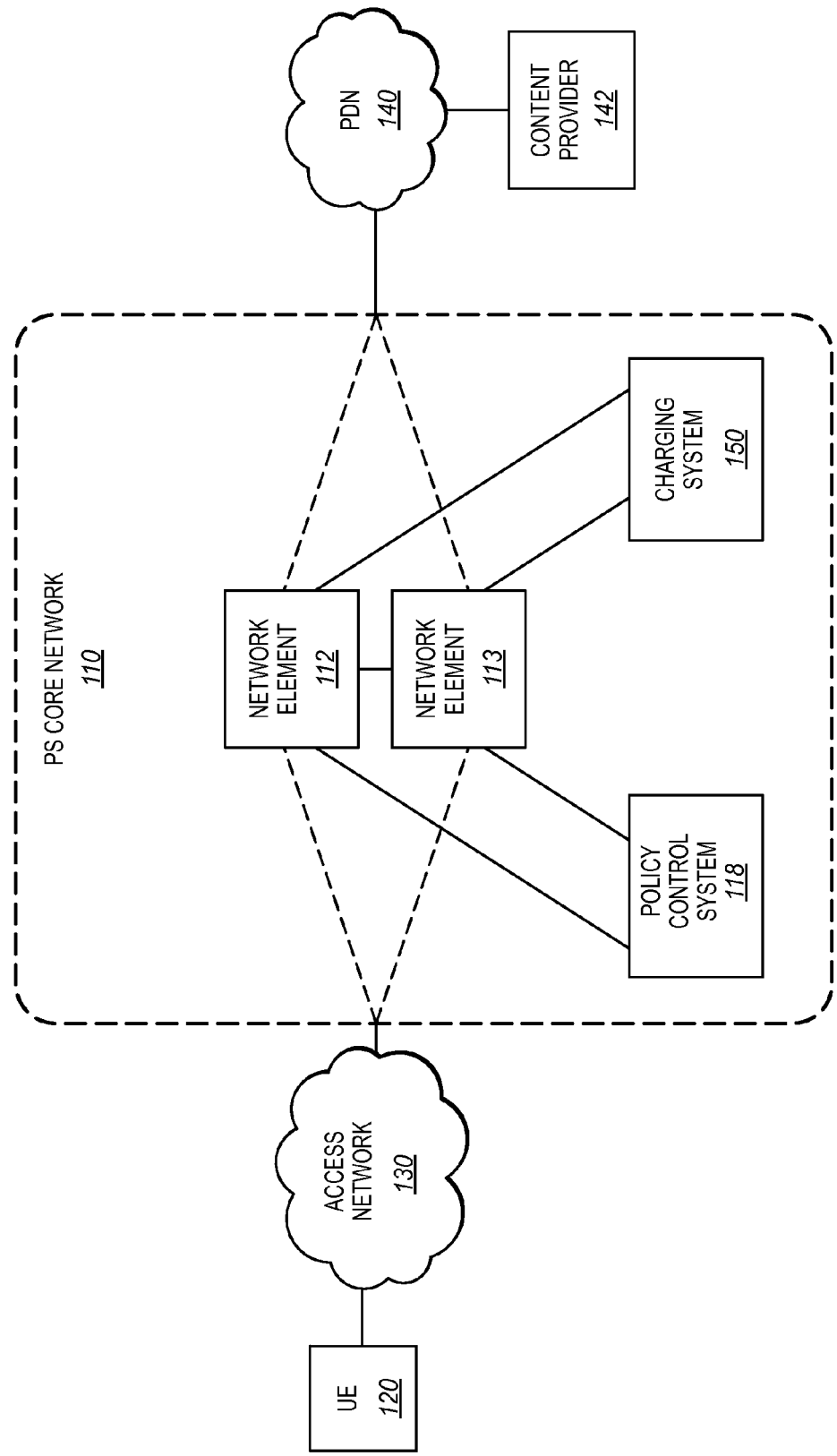
FIG. 1 illustrates a communication network in an exemplary embodiment.

FIG. 1 illustrates a communication network 100 in an exemplary embodiment. Communication network 100 may represent a Long Term Evolution (LTE) network or another type of Third Generation (3G) or Fourth Generation (4G) communication network. Network 100 includes a Packet-Switched (PS) core network 110 that provides various services to end users. One example of PS core network 110 is an Evolved Packet Core (EPC) network. In this embodiment, PS core network 110 includes network elements 112-113 that are each able to serve a session. One example of network element 112 may be a Packet Data Network Gateway (P-GW) of an Evolved Packet Core (EPC) network as described in the LTE standards (which may include a Policy and Charging Enforcement Function (PCEF)). One example of network element 113 may be a Serving Gateway (S-GW) of an EPC network as described in the LTE standards. PS core network 110 may include many more network elements that are not shown in FIG. 1.

PS core network 110 establishes and maintains sessions for User Equipment (UE) 120 of an end user (and other UEs not shown) to allow UE 120 to access data services. UE 120 is a mobile device, such as a mobile phone, a computer, a tablet, etc. UE 120 is able to access PS core network 110 through access network 130. Access network 130 comprises any type of network that interfaces UEs with PS core network 110. One example of access network 130 is a Radio Access Network (RAN), such as a UMTS Terrestrial Radio Access Network (UTRAN), an enhanced UTRAN (E-UTRAN), an Interworking-Wireless Local Area Network (I-WLAN), etc. PS core network 110 also connects to one or more external Packet Data Networks (PDN) 140, such as the internet.

Within PS core network 110, network elements 112-113 are able to serve a data session for UE 120. The session as described herein may be referred to as an IP Connectivity Access Network (IP-CAN) session. An IP-CAN session is an association between UE 120 (represented by an IPv4 address and/or an IPv6 prefix), and PDN 140. An IP-CAN session may incorporate one or more IP-CAN bearers. An IP-CAN bearer is an IP transmission path of a defined capacity, delay and bit error rate, etc. Each IP-CAN bearer may be made up of one or more data flows (also referred to as service data flows), which is a flow of packets.

Figure 2:
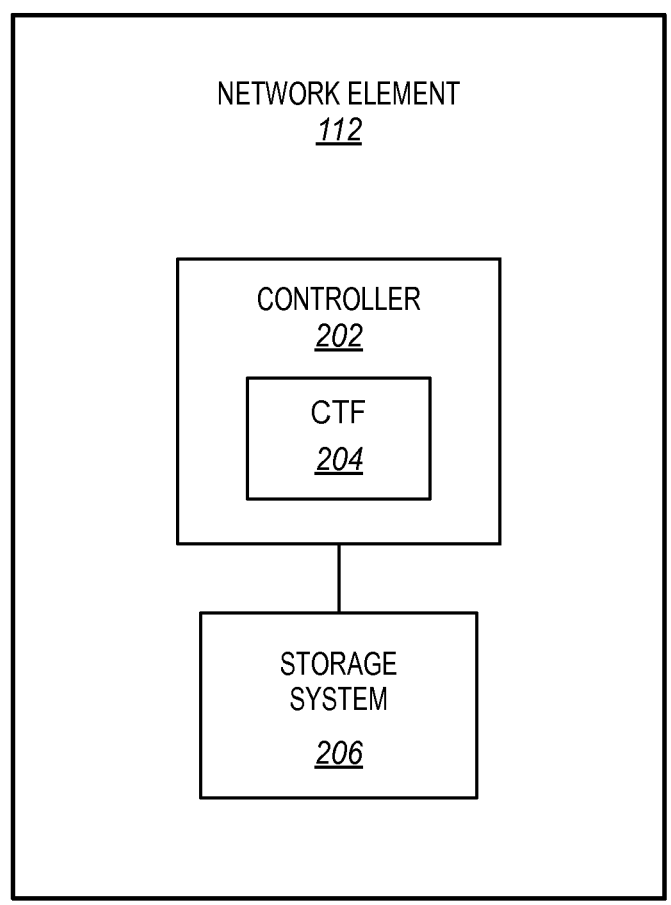
FIG. 2 is a block diagram of a network element in an exemplary embodiment.

FIG. 2 is a block diagram of network element 112 in an exemplary embodiment. Network element 112 includes a controller 202 (including a processor) that provides multiple functions for data flows, such as policy enforcement, packet filtering, packet screening, etc. Controller 202 also provides a Charging Trigger Function (CTF) 204. A CTF comprises any entity that generates charging events based on the observation of network resource usage. The CTF is the focal point for collecting information pertaining to chargeable events within a network element, assembling this information into matching charging events, and sending these charging events towards a charging function in the form of accounting requests. Network element 112 also includes a storage system 206 for storing data, such as a memory. Network element 112 may include other modules or functions that are not shown in FIG. 2 to serve a data session. Network element 113 (see FIG. 1) may have a similar configuration as is shown for network element 112.

In FIG. 1, PS core network 110 further includes a charging system 150. Charging system 150 comprises any system, server, or module operable to provide charging for sessions involving UE 120. Charging system 150 may represent an Online Charging System (OCS). An OCS is configured to receive charging requests (also referred to as credit requests for online charging) from network elements, and use the charging information contained in the charging requests to rate a session, to grant one or more quotas for the session (if sufficient credit is available), and to issue the granted quotas to network elements that serve the session. The network elements may then provide budget control based on the quotas granted by the OCS. Charging system 150 may alternatively represent an Offline Charging System (OFCS). An OFCS is configured to receive charging requests (also referred to as accounting requests for offline charging) from network elements, and use the charging information contained in the charging requests to construct Charging Data Records (CDRs). The purpose of offline charging is to transform the charging information into CDRs that are post-processed within the Billing Domain (BD) for the purpose of generating bills.

Assume for the following embodiment that UE 120 registers with PS core network 110, and initiates a data session. As part of the data session, UE 120 requests to download content (also referred to as data content) from a content provider 142 that is available over PDN 140. For example, UE 120 may request to download a video from content provider 142. In response to the download request, PS core network 110 establishes a bearer path between UE 120 and content provider 142 over PDN 140, such as an IP-CAN bearer. The bearer path is served or managed by one or both of network elements 112-113. With the bearer path established, content provider 142 may initiate the transfer of the requested content to UE 120 over the bearer path, which results in a flow of packets referred to as a data flow or a service data flow.

There may be instances where an entity inserts supplemental content in the data flow. Supplemental content comprises content that is added to a data flow that not requested by the end user or the UE of the end user. One example of supplemental content is advertising content, which is any data or information that promotes a product, a service, an event, etc. For instance, content provider 142 may insert advertising content along with the content (e.g., video) requested by UE 120, even though the advertising content was not requested by an end user. Alternatively, another entity (other than content provider 142) in the bearer path may be able to add the advertising content to the data flow.

When an entity inserts supplemental content into a data flow, the end user may be charged for the supplemental content even though he/she did not request the supplemental content. The end user may subscribe to a plan where he/she is charged based on network resource usage. For instance, the end user may be charged a certain rate for 10 MB of downlink usage. If supplemental content is inserted in a data flow, then the supplemental content will be considered part of the network resource usage of the end user and ultimately charged to the end user.

The embodiments described herein allow for supplemental content (e.g., advertising content) to be charged separately from the other content of the data flow that was requested by an end user. For example, if UE 120 requests to download a video from content provider 142 and advertising content is inserted into the data flow for the video, then the embodiments described herein allow for the advertising content to be charged separately from the video content of the data flow. Thus, the end user may not be charged for the advertising content, or may be charged at a reduced rate.

Figure 3:
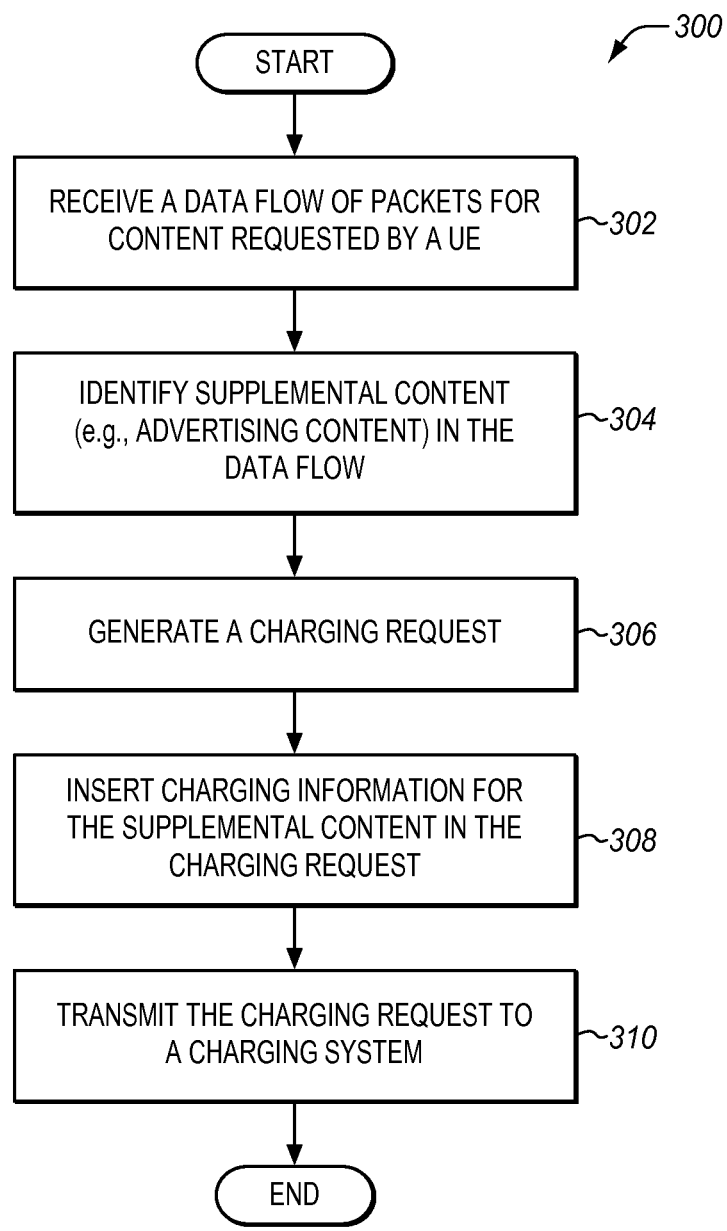
FIG. 3 is a flow chart illustrating a method for providing charging information for supplemental content to a charging system in an exemplary embodiment.

FIG. 3 is a flow chart illustrating a method 300 for providing charging information for supplemental content to a charging system in an exemplary embodiment. The steps of method 300 will be described with reference to network element 112 in FIG. 1, but those skilled in the art will appreciate that method 300 may be performed in other systems. Also, the steps of the flow charts described herein are not all inclusive and may include other steps not shown, and the steps may be performed in an alternative order.

In step 302, network element 112 receives the data flow for the content requested by UE 120. The data flow in this embodiment includes the content requested by UE 120 (referred to as the "requested content"), and supplemental content that was added to the data flow. Because network element 112 provides connectivity from UE 120 to PDN 140, the bearer path and consequently the data flow for UE 120 passes through network element 112.

In step 304, network element 112 identifies the supplemental content in the data flow. In one embodiment, network element 112 is able to identify the supplemental content in the data flow based on information inserted in a header field of the packets in the data flow. Content provider 142 or another intermediate entity that inserts the supplemental content in the data flow may also insert an identifier in a packet header field or extension field indicating that the corresponding packet includes supplemental content, such as advertising content. The identifier for the supplemental content may be inserted in a content-length field, a payload length field, or an extension field of the packets. The identifier for the supplemental content may indicate a type for the supplemental content, an owner or party responsible for the supplemental content, etc. The priority field of the packets that include supplemental content, which could be a header extension field, may also be set at a lower level(s) than "normal" packets that do not include supplemental content. Therefore, network element 112 may process the header/extension fields for the packets of the data flow to identify and count the packets that include supplemental content. Network element 112 may also parse other fields of the packets (e.g., payload) to identify other information regarding the supplemental content.

In step 306, network element 112 generates a charging request. As stated above, network element 112 includes CTF 204 (see FIG. 2) that is able to identify a chargeable event for the data session/data flow, and generate a charging request. CTF 204 is able to generate a charging request responsive to identifying the supplemental content in the data flow. The charging request generated in this step is for the supplemental content, and not simply for the data flow in general.

The type of charging request depends on whether the charging method for the data session/data flow is online charging or offline charging. If the charging method is online charging, then network element 112 generates an online credit request, such as a Diameter Ro Credit Control Request (CCR). If the charging method is offline charging, then network element 112 generates an offline accounting request, such as a Diameter Rf Accounting Request (ACR).

In step 308, network element 112 inserts charging information for the supplemental content in the charging request. Charging information for the supplemental content comprises data that reports a chargeable event specific for the supplemental content. The charging information for the supplemental content is distinct from general charging information for the data flow. Traditionally, a CTF would report charging information for a data flow, but this charging information did not include information specific to supplemental content in the data flow, such as the number of packets that include advertising content. According to this embodiment, the charging information inserted in the charging request is specific to the supplemental content that is inserted in the data flow.

The type of charging information inserted in the charging request for the supplemental content may vary as desired. As one example, the charging information may include an amount of supplemental content inserted in the data flow (e.g., number of bytes), the number of packets of the data flow that include supplemental content, an identifier for a party responsible for the supplemental content, etc. To insert the charging information for the supplemental content in the charging request, new fields or parameters may be defined in the charging request. For example, if the charging request is in Diameter protocol, then a new Attribute Value Pair (AVP) may be defined in Diameter for the charging information for the supplemental content. If the supplemental content is advertising content, then the new AVP may be:

```
Advertisement-Charging-Information:: = <AVP Header: xxx>
    < Advertisement-Charging-Policy >
    < Advertisement-Type >
    < Advertisement-Priority >
    < Advertisement-Octets >
    [ Advertisement-Packet-Count ]
    [ Advertisement-Owner -ID ]
    [ Advertisement-Minimum-QoS ]
```

In step 310, network element 112 transmits the charging request to charging system 150. Charging system 150 can then process the charging information for the supplemental content, and charge for the supplemental content separately from the requested content of the data flow, which is further described in FIG. 6.

In addition to reporting the charging information for the supplemental content to charging system 150, network element 112 also provides charging information for the requested content (e.g., the video) to charging system 150. For example, network element 112 may identify charging information specific for the requested content, such as a number of packets that include the requested content (and no supplemental content). Network element 112 may alternatively provide charging information for the overall data flow to charging system 150. For example, network element 112 may provide a number of packets for the overall data flow (including both the requested content and the supplemental content).

Figure 4:
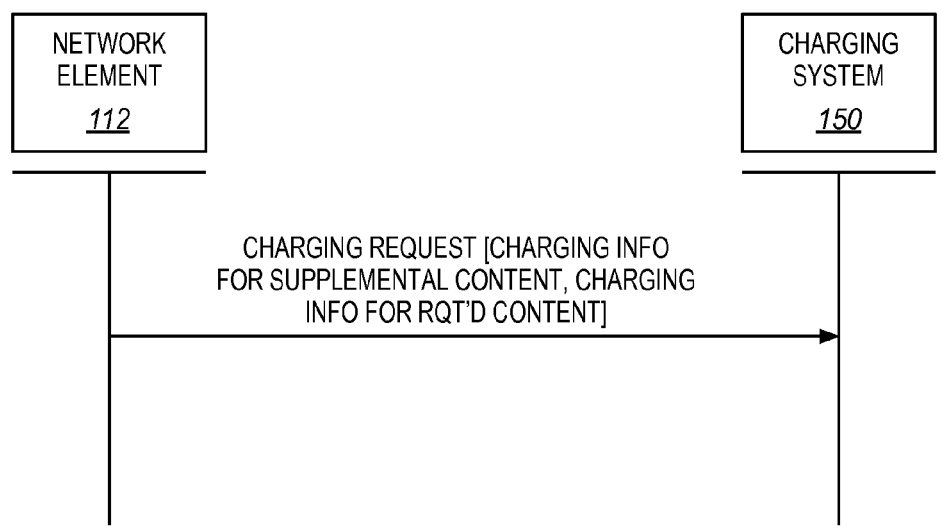
FIGS. 4-5 are message diagrams illustrating a network element providing charging requests to a charging system in an exemplary embodiment.
Figure 5:
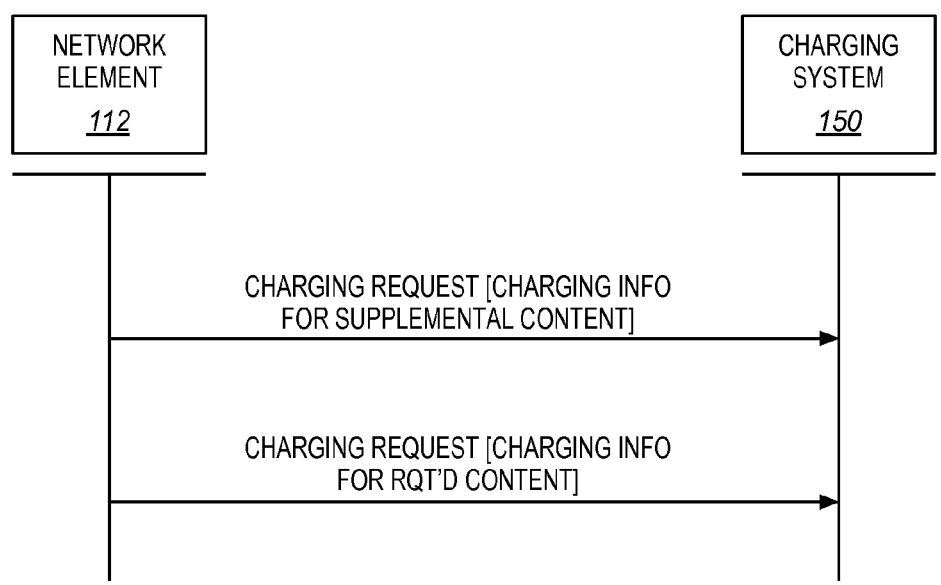

Network element 112 may provide the charging information for the supplemental content to charging system 150 in the same charging request as charging information for the requested content of the data flow, or in a separate charging request. FIGS. 4-5 are message diagrams illustrating network element 112 providing charging requests to charging system 150 in an exemplary embodiment. In FIG. 4, network element 112 sends a single charging request to charging system 150. Thus, network element 112 inserts the charging information for the supplemental content and charging information for the requested content in the same charging request as discussed in method 200. In this scenario, network element 112 may insert the charging information for the requested content in parameters traditionally defined for a data flow, and may insert the charging information for the supplemental content in the new parameters of the charging request. Network element 112 then sends the charging request to charging system 150.

In FIG. 5, network element 112 sends two charging requests to charging system 150. In addition to sending the charging request that includes the charging information for the supplemental content, network element 112 generates another charging request for the data flow. Network element 112 inserts the charging information for the requested content in the other charging request, and transmits the other charging request to charging system 150 separately from the charging request for the supplemental content.

Also, if network element 112 is responsible for creating Charging Data Records (CDR) for data flows, then network element 112 may insert both the charging information for the supplemental content and the charging information for the requested content in separate fields of a CDR.

Because network element 112 provides separate charging information for the supplemental content and the requested content, charging system 150 is able to charge for the supplemental content individually from the requested content. This is further illustrated in FIG. 6.

Figure 6:
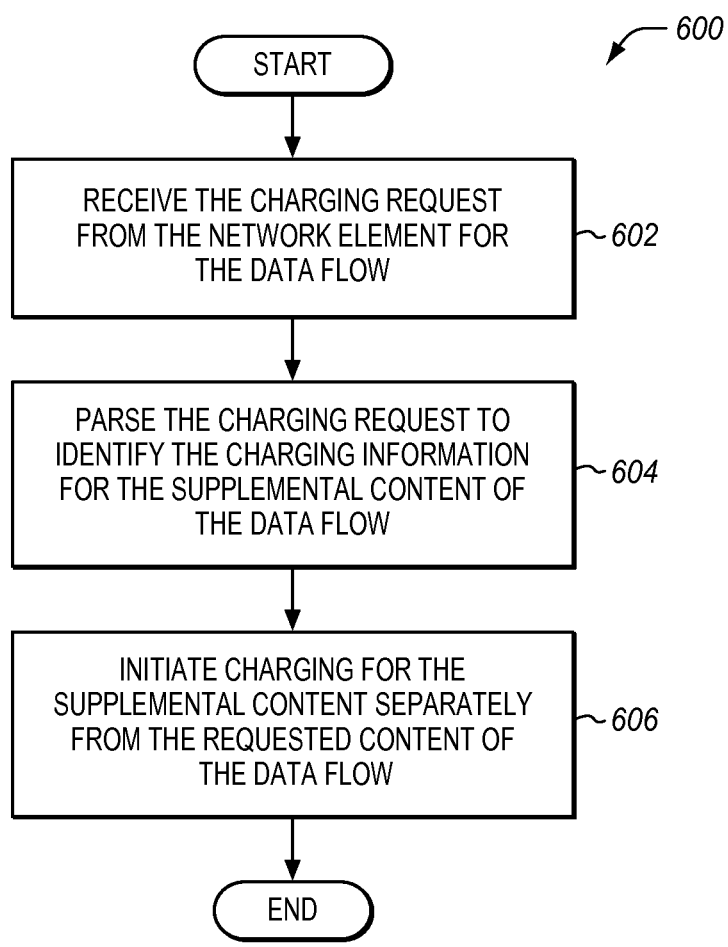
FIG. 6 is a flow chart illustrating a method of charging for supplemental content in an exemplary embodiment.

FIG. 6 is a flow chart illustrating a method 600 of charging for supplemental content in an exemplary embodiment. The steps of method 600 will be described with reference to charging system 150 in FIG. 1, but those skilled in the art will appreciate that method 600 may be performed in other systems.

In step 602, charging system 150 receives the charging request from network element 112 for the data flow. In step 604, charging system 150 parses the charging request to identify the charging information for the supplemental content of the data flow. Charging system 150 may be programmed to parse new parameters of the charging request to identify the charging information for the supplemental content. In step 606, charging system 150 initiates charging for the supplemental content separately from the requested content of the data flow. In other words, charging system 150 is able to charge for the supplemental content individually from the rest of the data flow (e.g., the requested content).

For example, assume that charging system 150 receives a charging request that includes charging information for the supplemental content indicating a packet count for supplemental content, and also includes charging information for the requested content indicating the overall packet count for the data flow. In this instance, charging system 150 may subtract the packet count for the supplemental content from the overall packet count for the data flow to identify a packet count for the requested content. Charging system 150 may then apply one rate to the packet count for the supplemental content, and apply another (different) rate to the packet count for the requested content. Thus, the supplemental content is charged in a separate manner from the requested content.

As shown in FIGS. 4-5, charging system 150 may receive a single charging request from network element 112 that includes both the charging information for the supplemental content and the charging information for the requested content. Thus, charging system 150 may parse the single charging request to identify both sets of charging information, and initiate charging for the supplemental content and the requested content separately. Alternatively, charging system 150 may receive two charging requests from network element 112: one charging request that includes the charging information for the supplemental content, and another charging request that includes the charging information for the requested content. In this scenario, charging system 150 parses each charging request, and initiates charging for the supplemental content and the requested content separately.

When charging for the supplemental content, charging system 150 may no-charge the end user of UE 120 for the supplemental content, or may charge the end user at a reduced rate compared to the rest of the data flow. Charging system 150 may also charge another party for the supplemental content instead of the end user of UE 120, such as the party responsible for the supplemental content, or a party that caused the supplemental content to be inserted in the data flow. Thus, the end user of UE 120 may avoid having to pay for supplemental content that is inserted in a data flow without his/her permission.

In addition to reporting charging information for supplemental content to charging system 150, network element 112 may report information regarding the supplemental content to a policy control element 118 of network 100. Policy control element 118 comprises any server, system, or module operable to determine policy rules for services accessed by UE 120 and other UE's, which may also be referred to as making Policy and Charging Control (PCC) decisions. Network operators implement Policy and Charging Control (PCC) within their networks to control how services are provided to end users. Policy control refers to the process of controlling the bearer path for data flows, such as for bearer establishment, Quality of Service (QoS) control, and gating control (blocking or allowing packets to pass). Policy rules are predefined for each end user and govern which network services the end user is allowed to access, the bandwidth level that is provided, when the services are allowed, how long the services are allowed, etc. Charging control refers to the process of associating packets of a data flow with a charging key or charging identifier, and applying online charging and/or offline charging as appropriate. Charging rules are predefined for each end user and govern the type of charging applied to a service, the tariff(s) applied to a service, etc. The policy rules and charging rules are set out in a service plan subscribed to by the end user. One example of a policy control element 118 is a Policy and Charging Rules Function (PCRF) of an LTE network.

Figure 7:
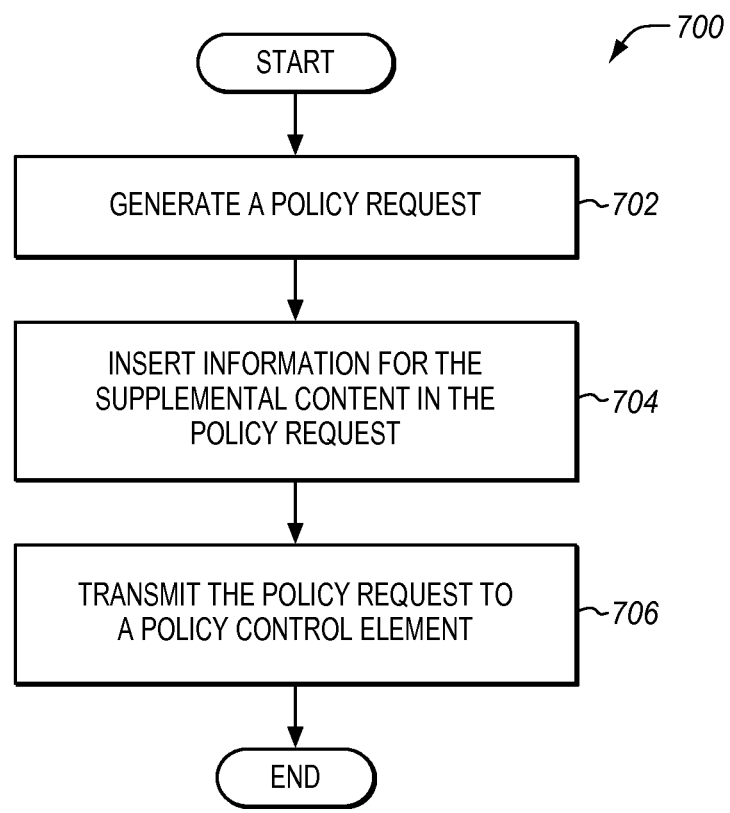
FIG. 7 is a flow chart illustrating a method of reporting information for supplemental content to a policy control element in an exemplary embodiment.

FIG. 7 is a flow chart illustrating a method 700 of reporting information for supplemental content to a policy control element in an exemplary embodiment. The steps of method 700 will be described with reference to network element 112 in FIG. 1, but those skilled in the art will appreciate that method 700 may be performed in other systems.

When network element 112 identifies the supplemental content (e.g., advertising content) in the data flow, network element 112 may trigger for a new policy decision for the data flow. Thus, network element 112 generates a policy request in step 702. Network element 112 then inserts information for the supplemental content in the policy request in step 704. The information for the supplemental content comprises data for the supplemental content that is used in a policy decision. As one example, the information may include an amount of supplemental content inserted in the data flow (e.g., number of bytes), the number of packets of the data flow that include supplemental content, an identifier for a party responsible for the advertising content, etc. In order to insert the information for the supplemental content in the policy request, new fields may be defined in the policy request. For example, if the policy request is in Diameter protocol (e.g., Diameter Gx), a new AVP may be defined in Diameter for the information for the supplemental content. If the supplemental content is advertising content, then the new AVP may be:

Advertisement-Insertion-Information :: = <AVP Header: xxx>
    < Advertisement-Type >
    < Advertisement-Priority >
    < Advertisement-Octets >
    [ Advertisement-Owner -ID ]
    [ Advertisement-Minimum-QoS ]
    [ Advertisement-Packet-Count ]

In step 706, network element 112 transmits the policy request to policy control element 118 for a policy decision. Policy control element 118 can then process the information for the supplemental content to make a new PCC decision for the data flow. For example, policy control element 118 may determine overall QoS changes, a charging policy on packets that include supplemental content to the end user, a charging policy on packets that include supplemental content to a party responsible for the supplemental content, etc. After making a new PCC decision, policy control element 118 may provide PCC rules to network element 112 and/or charging system 150.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof

We claim:

1. An apparatus comprising:
   a Policy and Charging Enforcement Function (PCEF) for an Evolved Packet Core (EPC) network that serves mobile User Equipment (UE);
   the PCEF connects to a Policy and Charging Rules Function (PCRF) of the EPC network, and connects to a charging system;
   the PCEF comprising a processor configured to receive a data flow of packets for a download of content requested by the UE, and to identify supplemental content in the data flow that was not requested by the UE;
   the processor is configured to trigger a new Policy and Charging Control (PCC) decision for the data flow in response to identifying the supplemental content, to generate a policy request, to insert information for the supplemental content in the policy request, to transmit the policy request to the PCRF for the new PCC decision, and to receive PCC rules for the data flow from the PCRF for the new PCC decision, wherein the PCC rules specify that the supplemental content is charged separately from the content requested by the UE;
   the processor is configured to generate a charging request, to insert charging information for the supplemental content in the charging request to report a chargeable event specific for the supplemental content, and to transmit the charging request to the charging system to charge for the supplemental content separately from the content requested by the UE.

2. The apparatus of claim 1 wherein:
   the processor of the PCEF is configured to count a number of packets carrying the supplemental content in the data flow, and to insert an indicator of the number of packets carrying the supplemental content in the charging request.

3. The apparatus of claim 1 wherein:
   the processor of the PCEF is configured to identify a party responsible for the supplemental content, and to insert an indicator of the party in the charging request.

4. The apparatus of claim 1 wherein:
   the processor of the PCEF is configured to process an identifier in a header field of a respective packet in the data flow that indicates whether the respective packet carries the supplemental content.

5. The apparatus of claim 1 wherein:
   the charging request comprises a Diameter charging request; and
   an Attribute Value Pair (AVP) is defined for the charging information for the supplemental content in the Diameter charging request.

6. The apparatus of claim 1 wherein:
   the processor of the PCEF is configured to insert charging information for the content requested by the UE in the charging request separately from the charging information for the supplemental content.

7. The apparatus of claim 1 wherein:
   the processor of the PCEF is configured to generate a second charging request, and to insert charging information for the content requested by the UE in the second charging request.

8. The apparatus of claim 1 wherein:
   the policy request comprises a Diameter Gx request; and
   an Attribute Value Pair (AVP) is defined for the information for the supplemental content in the Diameter Gx request.

9. A method operable in a Policy and Charging Enforcement Function (PCEF) of an Evolved Packet Core (EPC) network that serves mobile User Equipment (UE), the method comprising:
   receiving, in the PCEF, a data flow of packets for a download of content requested by the UE;
   identifying supplemental content in the data flow, wherein the supplemental content was not requested by the UE;
   triggering a new Policy and Charging Control (PCC) decision for the data flow in response to identifying the supplemental content;
   generating a policy request;
   inserting information for the supplemental content in the policy request;
   transmitting the policy request from the PCEF to a Policy and Charging Rules Function (PCRF) of the EPC network for the new PCC decision;
   receiving PCC rules for the data flow in the PCEF from the PCRF for the new PCC decision, wherein the PCC rules specify that the supplemental content is charged separately from the content requested by the UE;
   generating a charging request in the PCEF;
   inserting charging information for the supplemental content in the charging request to report a chargeable event specific for the supplemental content; and
   transmitting the charging request from the PCEF to a charging system to charge for the supplemental content separately from the content requested by the UE.

10. The method of claim 9 wherein inserting charging information for the supplemental content in the charging request comprises:
    counting a number of packets carrying the supplemental content in the data flow; and
    inserting an indicator of the number of packets carrying the supplemental content in the charging request.

11. The method of claim 9 wherein inserting charging information for the supplemental content in the charging request comprises:
    identifying a party responsible for the supplemental content; and
    inserting an indicator of the party in the charging request.

12. The method of claim 9 wherein identifying supplemental content in the data flow comprises:
    processing an identifier in a header field of a respective packet in the data flow which indicates that the respective packet carries the supplemental content.

13. The method of claim 9 wherein:
    the charging request comprises a Diameter charging request; and
    an Attribute Value Pair (AVP) is defined for the charging information for the supplemental content in the Diameter charging request.

14. The method of claim 9 further comprising:
    inserting charging information for the content requested by the UE in the charging request separately from the charging information for the supplemental content.

15. The method of claim 9 further comprising:
generating a second charging request; and
inserting charging information for the content requested by the UE in the second charging request.

16. The method of claim 9 wherein:
the policy request comprises a Diameter Gx request; and
an Attribute Value Pair (AVP) is defined for the information for the supplemental content in the Diameter Gx request.

* * * * *